US008472778B2

(12) United States Patent
Kimura et al.

(10) Patent No.: US 8,472,778 B2
(45) Date of Patent: Jun. 25, 2013

(54) VIDEO PLAYER AND VIDEO PLAYBACK CONTROL METHOD

(75) Inventors: Masaru Kimura, Iwaki (JP); Shinji Wakabayashi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 961 days.

(21) Appl. No.: 12/047,041

(22) Filed: Mar. 12, 2008

(65) Prior Publication Data

US 2008/0253737 A1  Oct. 16, 2008

(30) Foreign Application Priority Data

Mar. 30, 2007 (JP) .................. 2007-090914

(51) Int. Cl.
*H04N 9/80* (2006.01)
*H04N 5/783* (2006.01)

(52) U.S. Cl.
USPC ............................. 386/68; 386/248; 386/343

(58) Field of Classification Search
USPC .......................................... 386/68, 248, 343
See application file for complete search history.

(56) References Cited

U.S. PATENT DOCUMENTS

| 6,151,017 | A | 11/2000 | Suzoka et al. |
| 2002/0100052 | A1* | 7/2002 | Daniels ........................... 725/87 |
| 2004/0012621 | A1* | 1/2004 | Kaneko et al. ................ 345/716 |
| 2005/0123267 | A1 | 6/2005 | Tsumagari et al. |
| 2006/0010400 | A1 | 1/2006 | Dehlin et al. |
| 2006/0077183 | A1* | 4/2006 | Studt ............................. 345/173 |
| 2007/0003215 | A1 | 1/2007 | Ito et al. |
| 2008/0107396 | A1* | 5/2008 | Chung et al. .................... 386/85 |

FOREIGN PATENT DOCUMENTS

| EP | 1 615 109 | 6/2005 |
| JP | 09-81361 | 3/1997 |
| JP | 2002-63103 | 2/2002 |
| JP | 2004-54435 | 2/2004 |
| JP | 2004-054435 | 2/2004 |
| JP | 2005-151147 | 6/2005 |
| JP | 2007-13358 | 1/2007 |

OTHER PUBLICATIONS

Office action for Japanese Patent Application No. 2007-090914 dated Aug. 2, 2011, 2 pgs.
Extended European Search Report for EP 08 00 5910 dated Mar. 15, 2012, 8 pgs.
Japanese Office Action dated Apr. 3, 2012 for JP2007-090914, 2 pgs.

* cited by examiner

*Primary Examiner* — Carl Colin
*Assistant Examiner* — John Elmore
(74) *Attorney, Agent, or Firm* — Brinks Hofer Gilson & Lione

(57) ABSTRACT

A video player and a video-playback control method which are capable of easily performing a selection operation on a display object in a moving image are disclosed. The video player predicts the occurrence of the selection operation of the display object, which is an area for which an action is defined in the moving image, by the start of a move operation of the cursor 51 or the proximity of a hand to a touch panel, and changes the playback state of the title to pause or slow playback. Description information defined for the display object may be automatically displayed. Also, the areas of the display objects may be visualized by displaying figures.

17 Claims, 9 Drawing Sheets

TITLE DATA

TITLE-PLAYBACK
CONTROL INFORMATION

- CONTENT-PLAYBACK CONTROL DATA
- CONTENT-PLAYBACK CONTROL DATA
- CONTENT-PLAYBACK CONTROL DATA
  - CONTENT IDENTIFIER
  - CONTENT TYPE
  - PLAYBACK START TIME
  - PLAYBACK END TIME
  - CONTENT DISPOSITION INFORMATION
  - CONTENT DESCRIPTION INFORMATION
    - DESCRIPTION TYPE
    - DESCRIPTION TEXT

CONTENT INFORMATION

- CONTENT DEFINITION DATA
- CONTENT DEFINITION DATA
- CONTENT DEFINITION DATA
  - CONTENT IDENTIFIER
  - SCRIPT
  - RESOURCE URL

RESOURCE DATA

- MOVING IMAGE DATA
- STILL IMAGE DATA
- AUDIO DATA

FIG. 2

VIDEO PLAYER AND VIDEO PLAYBACK CONTROL METHOD

RELATED APPLICATION

The present application claims priority to Japanese Patent Application Number 2007-090914, filed Mar. 30, 2007, the entirety of which is hereby incorporated by reference.

BACKGROUND

1. Field of the Invention

The present invention relates to a technique for supporting a user's operation on a display object in a video player playing back a video content including an interactive display object.

2. Description of Related Art

To date, video players playing back video contents including interactive display objects have been known (for example, refer to Japanese Unexamined Patent Application Publication No. 2002-63103).

In such a video player, a technique for supporting a user's operation on a display object so as to allow the user to easily select a display object has been known as follows. When individual objects included in a moving image are assumed to be display objects, and a cursor for accepting an operation on a display object is moved in a display window used for displaying the moving image, an interactive display object is highlighted or the playback speed of a moving image is reduced (refer to Japanese Unexamined Patent Application Publication No. 2004-54435).

By the technique in Japanese Unexamined Patent Application Publication No. 2004-54435, when a display object is displayed in a moving image only for a short period of time, the playback of that display object is sometimes terminated before a user can move a cursor in a display window used for displaying the moving image. As a result, the selection operation of the display object sometimes cannot be performed.

BRIEF SUMMARY

Accordingly, it is an object of the present invention to provide a video player capable of supporting a selection operation of a display object, even if the display object is displayed in a moving image only for a short period of time.

In order to achieve the above-described object, according to one embodiment of the present invention, there is provided a video player for playing back and displaying a moving image, including: a moving-image playback and display section for playing back and displaying the moving image on the basis of video data representing the moving image, including a display object for which an action is defined; a selection acceptance section for accepting from a user a selection of the display object included in the moving image being played back and displayed by the moving-image playback and display section using a cursor displayed on the moving image and capable of being moved; an action for execution section executing the action defined for the display object the selection of which is accepted by the selection acceptance section; and a selection support section, wherein the selection support section includes a selection-operation occurrence prediction section for detecting the occurrence of a selection preparatory operation such as a move operation of the cursor by the user. When the selection-operation occurrence prediction section detects the occurrence of the selection preparatory operation, a playback-speed control section changes a playback speed of the moving image to a slow display or a pause display.

With such a video player, when the user starts a move operation of the cursor for selecting a display object, the playback speed of the moving image is immediately changed to the playback speed of the slow display or the pause display regardless of the cursor position. Accordingly, even if the display object that the user is going to select is a display object displayed in the moving image for a short period of time, the playback speed of the moving image can be changed to the playback speed of the slow display or the pause display before the completion of the display period of the display object, and thus the user can easily make a selection of the display object in the moving image being displayed by the slow display or the pause display.

Also, in order to achieve the above-described object, according to another embodiment of the present invention, there is provided a video player for playing back and displaying a moving image, including: a moving-image playback and display section for playing back and displaying the moving image on the basis of video data representing the moving image, including a display object for which an action is defined; a selection operation acceptance section for accepting from a user a selection operation of the display object included in the moving image being played back and displayed by the moving-image playback and display section; an action execution section for executing the action defined for the display object the selection operation of which is accepted by the selection operation acceptance section; and a selection support section, wherein the selection support section includes a selection-operation occurrence prediction section for detecting the occurrence of a selection preparatory operation by the proximity of the user to the selection operation acceptance section. When the selection-operation occurrence prediction section detects the occurrence of the selection preparatory operation, a playback-speed control section changes a playback speed of the moving image to a slow display or pause display. More specifically, the selection operation acceptance section may be a touch panel. In this case, the video player is provided with a proximity sensor for detecting the proximity of a hand to the touch panel, and when the proximity sensor has detected the proximity of a hand to the touch panel, the selection-operation occurrence prediction section detects the occurrence of the selection preparatory operation.

With such a video player, when the user brings a hand closer to the selection operation acceptance section, such as a touch panel, etc., for selecting a display object, the playback speed of the moving image is immediately changed to the playback speed of the slow display or the pause display. Accordingly, even if the display object that the user is going to select is a display object displayed on the moving image for a short period of time, the playback speed of the moving image can be changed to the playback speed of the slow display or the pause display before the completion of the display period of the display object, and thus the user can easily select the display object on the moving image being displayed by the slow display or the pause display.

The selection support section of any embodiment of video player described above preferably includes display-object position presentation means for displaying a position on the moving image of the display object for which the action is defined when the selection-operation occurrence prediction section has detected an occurrence of the selection preparatory operation. Also, when the action defined for the display object includes an attribute display action, being an action for displaying an item on the display object, the selection support section preferably includes an attribute display section for displaying the item when the selection-operation occurrence prediction section has detected an occurrence of the selection preparatory operation, in order to save labor and facilitate the user's selection operation of a display object.

According to another embodiment of the present invention, there is provided a video player for playing back and displaying a moving image, including: a moving-image playback and display section for playing back and displaying the moving image on the basis of video data representing the moving image, including a display object for which an action is defined; a selection operation acceptance section for accepting from a user a selection operation of the display object included in the moving image being played back and displayed by the moving-image playback and display section; an action execution section for executing the action defined for the display object the selection operation of which is accepted by the selection operation acceptance section; and a selection support section, wherein the action defined for the display object includes an attribute display action, being an action for displaying an item on the display object, and the selection support section includes a display-object detection section for detecting, on the moving image played back and displayed by the moving-image playback and display section, an appearance of a display object for which the attribute display action displaying an item satisfying a predetermined condition is defined, a playback-speed control section for changing a playback speed of the moving image of the moving-image playback and display section to a playback speed of displaying the moving image by slow display or pause display, when the display-object detection section detects the appearance, a playback-speed control section for changing a playback speed of the moving image to a slow display or pause display, and when the display-object detection section detects the appearance, an attribute display section for displaying an item defined for a display object for which the attribute display action displaying an item satisfies the predetermined condition.

With such a video player, by setting the predetermined condition, when a display object related to an item in which the user is interested appears, it is possible to automatically change the playback speed of the moving image to the playback speed of the slow display or the pause display, which is suitable for viewing the item, and to automatically display the item related to the display object which is interesting to the user.

Each embodiment of video player described above may be a receiver receiving the video data having been broadcast, wherein the moving-image playback and display section plays back and displays the moving image on the basis of the video data being received by the receiver in real time with the reception of the video data. In this case, when the playback-speed control section of the selection support section changes a playback speed of the moving image of the moving-image playback and display section to a playback speed of slow display or pause display, the playback-speed control section preferably starts recording for time-shift playback the video data being received by the receiver, terminates playback of the moving image by slow display or pause display at a predetermined time and starts time-shift playback of the moving image using video data recorded at the playback position at which the playback is terminated. Moreover, the playback-speed control section of the selection support section may cause the moving-image playback and display section to perform the time-shift playback at a playback speed that is faster than normal until a playback position is reached at which the moving image is played back in real time against the reception of the video data.

By this means, it is possible to eliminate the occurrence of a time period during which the user cannot view the moving image because of the delay of the playback position from the time of real-time playback and the playback position of the moving image at the playback speed of the slow display or the pause display.

Also, if any embodiment of video player described above includes a network connection section connecting to a network, and the action defined for the display object includes a network access action accessing information on the network, and when the action execution section fails to connect to the network through the network connection section at the time of executing a network access action, the action execution section saves information for identifying the contents of the network access action. By this means, the network access action that cannot be executed because of an inability to connect to a network becomes possible to be executed when it becomes possible to connect to the network afterwards using the saved information.

As described above, with a video player according to the present invention, it is possible to support a selection operation of a display object even if the display object is displayed in a moving image only for a short period of time.

BRIEF DESCRIPTION OF THE DRAWINGS

FIG. 2 is a diagram illustrating contents of title data to be played back by the video player according to the embodiment of the present invention;

DETAILED DESCRIPTION OF THE PREFERRED EMBODIMENTS

In the following, a description will be given of an embodiment of the present invention.

Figure 1:
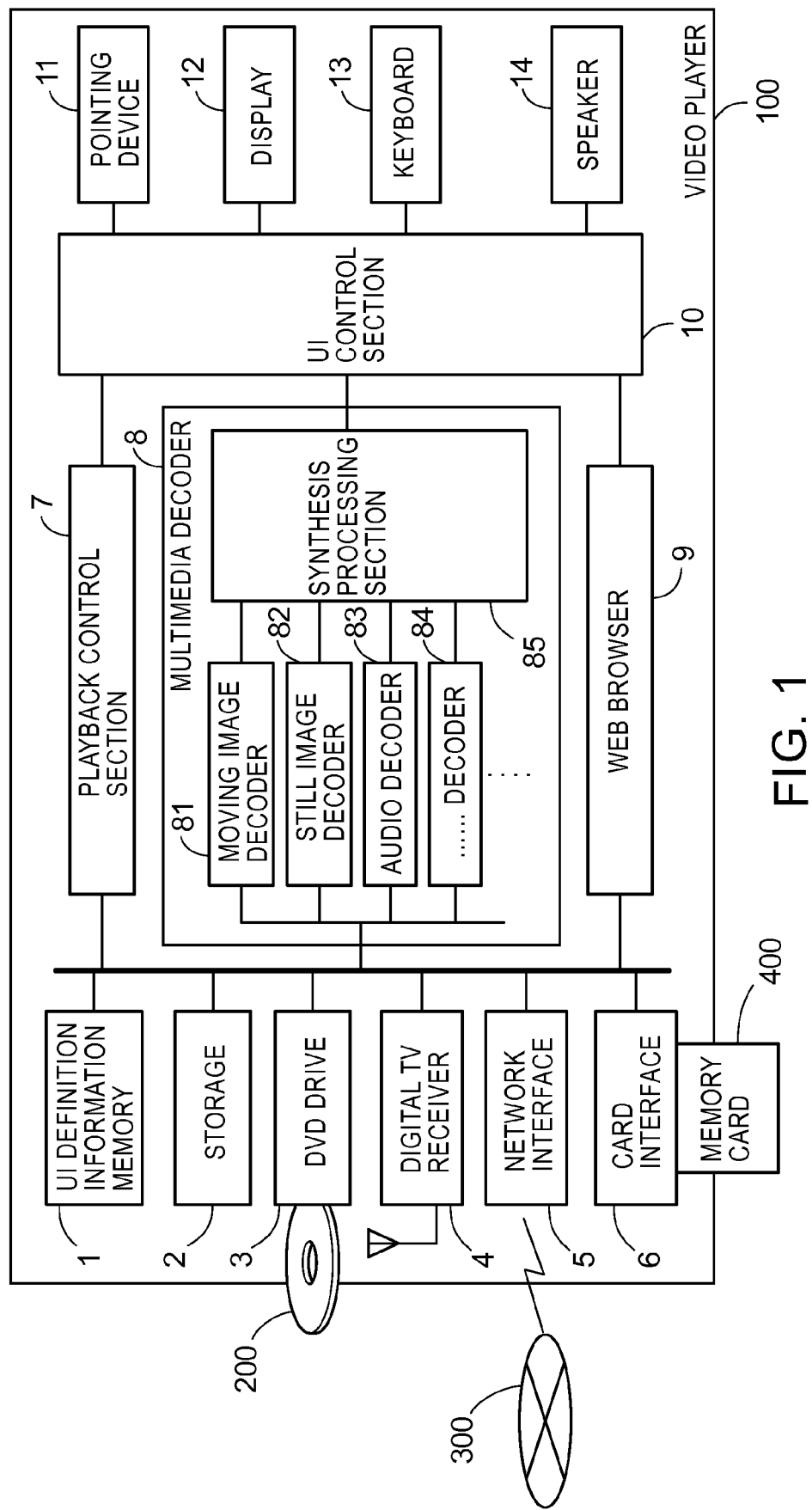
FIG. 1 a block diagram illustrating a configuration of a video player according to an embodiment of the present invention.

FIG. 1 illustrates a configuration of a video player according to the present embodiment. As shown in the figure, a video player 100 includes a UI definition information memory 1, a storage 2 such as an HDD, a DVD drive 3 for reading a DVD disc 200, such as an HD-DVD, a digital TV receiver 4 receiving digital TV broadcasting, a network interface 5 connecting to a WAN 300 such as the Internet through wireless communication, a card interface 6 reading from and writing to a memory card 400, a playback control section 7, a multimedia decoder 8, a Web browser 9, a UI control section 10, a pointing device 11, a display 12, a keyboard 13, and a speaker 14.

The multimedia decoder 8 includes various kinds of digital media decoders, such as a moving image decoder 81, a still image decoder 82, an audio decoder 83, another decoder 84, etc., and a synthesis processing section 85 for synthesizing each display object decoded by each decoder of a graphics system and mixing each audio stream decoded by each decoder of an audio system.

With such a configuration, the video player 100 plays back a title defined by the title data read from the DVD disc 200 or the title data received by the digital TV receiver 4. Here, a title is defined as a playback sequence of a plurality of contents.

As shown in FIG. 2, the title data includes title-playback control information, content information, and resource data.

The resource data is a set of resources, which are types (moving image data, still image data, audio data, etc.) of content.

The content information has content definition data provided for each content, and each content definition data includes a content identifier, which is identification information of the content definition data, a script which is executed at content playback start time and which sets a user interface definition defining a user interface used at content playback time in the UI definition information memory 1, and a resource URL specifying the location of a content resource. In this regard, with the resource URL, it is possible to specify an external resource, such as a resource on the WAN 300 as the content resource in addition to resources included in the title data.

The title-playback control information has content-playback control data describing playback control information for each content. Each content-playback control data has the content identifier of the content definition data of the corresponding content, a content type indicating a type of content, such as a moving image, a still image, audio data, etc., a playback start time of the content, a playback end time of the content, content disposition information, and content description information.

The content disposition information specifies the disposition area on the display screen of the display 12 of that content when the content is displayed on the display 12. The display screen of the display 12 is formed by a plurality of display planes displayed by being overlaid, and the content disposition information specifies the display plane on which the content is displayed and the disposition area on the display plane.

The content description information is the description information of the content, and records a description type indicating the type of description and a description text, which is a text representing the contents of the description.

The playback control section 7 of the video player 100 controls the title as follows on the basis of such title data. The resource shown by the resource URL of the content definition data having a content identifier described in the content playback control data is decoded by the decoder corresponding to the resource type (moving image data, still image data, audio data, etc.) of the multimedia decoder 8 during the time from the playback start time to the playback end time, described in the content playback control data, on the basis of each content-playback control data of the title control information.

Each audio content decoded by an audio system decoder, such as an audio decoder 83, is mixed by the synthesis processing section 85 and is output to the speaker 14 through the UI control section 10. Also, each display content decoded by a graphics system decoder, such as the moving image decoder 81, a still image decoder 82, etc., is synthesized by the synthesis processing section 85 so as to be disposed at the disposition area specified the content disposition information of the content-playback control data of each display content, and is provided to the display 12 through the UI control section 10.

The playback control section 7 executes the script of the content definition information of the content to be started playing back at the time of starting playing back the content whose starting time has come, and provides the user with the user interface in accordance with the user interface definition stored in the UI definition information memory 1 by that script through the UI control section 10 until the end of the playback of the content.

With such title data and video player 100, it is possible to achieve the playback of the video contents including an interactive display object, as shown in FIG. 3. On a moving image object displayed by a moving image content 30 as shown in FIG. 3A, invisible area objects 31, 32, and 33 disposed on the moving image content 30 are set as shown in FIG. 3B. When the user has selected the area objects 31, 32, and 33, the actions defined for the invisible area objects 31, 32, and 33 are executed.

Thus, an image part in each of the area objects 31, 32, and 33 in the moving image object 30 is defined as a logical display object for the user, and it is possible to operate this logical display object interactively. Hereinafter, a logical display object functioning interactively like this is called an "interactive logical display object".

The setting of such an invisible area object on a moving image object can be achieved by the playback of a content having a disposition area specified by the content disposition information of the content-playback control data and having no resource to be displayed or using a transparent still image as a resource.

The selection of such an area object can be accepted as follows. When a user's positional input on the display screen has occurred using the pointing device 11, the playback control section 7 accepts, as the object selected by the user, an object displayed by a content including the input position in the disposition area shown by the content disposition information of that content-playback control data. However, if there are a plurality of contents including the input position in the disposition area, the object displayed by the content having content disposition information indicating the disposition area on the highest display plane is accepted as the object selected by the user. By this means, when the user inputs a position in the area object on the display screen using the pointing device 11, it becomes possible to accept the selection of that area object.

The definition of an action for an area object, and the execution of an action at the time of area object selection can be achieved, for example, as follows. That is, the playback control section 7 performs a display operation (attribute display action) of the content description information of the content-playback control information of the content displaying the object selected by the user for a certain period of time.

Figure 3A:
FIG. 3 illustrates an interactive logical display object to be displayed by the video player according to the embodiment of the present invention.
Figure 3B:
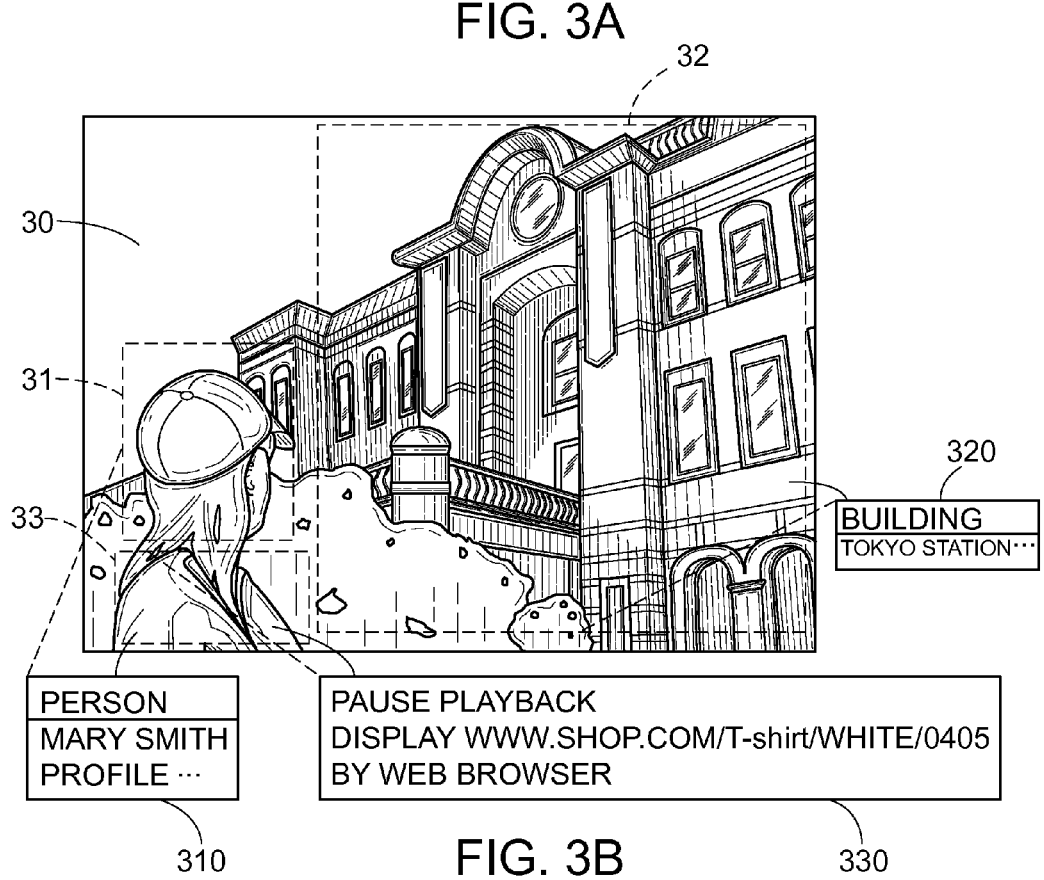
Figure 3C:
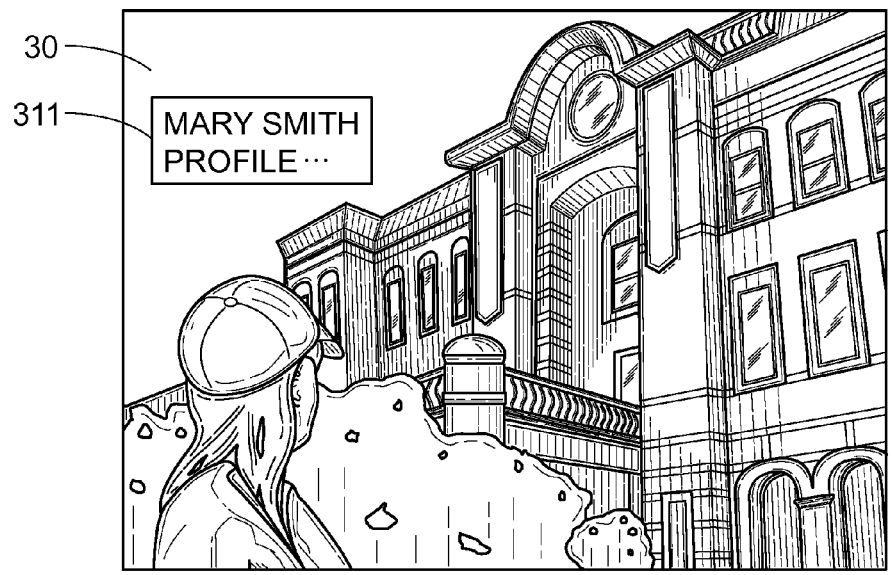

If the content description information is set, as shown by 310 and 320 in FIG. 3B, for the content displaying the area objects 31 and 32, for example as shown in FIG. 3C, when the user points to an image portion of a person in the moving image, which is an interactive logical display object defined by the area object 31, using the pointing device 11, as shown in FIG. 3C an interactive operation displaying a profile 311, described in the content description information, is achieved.

Figure 3D:
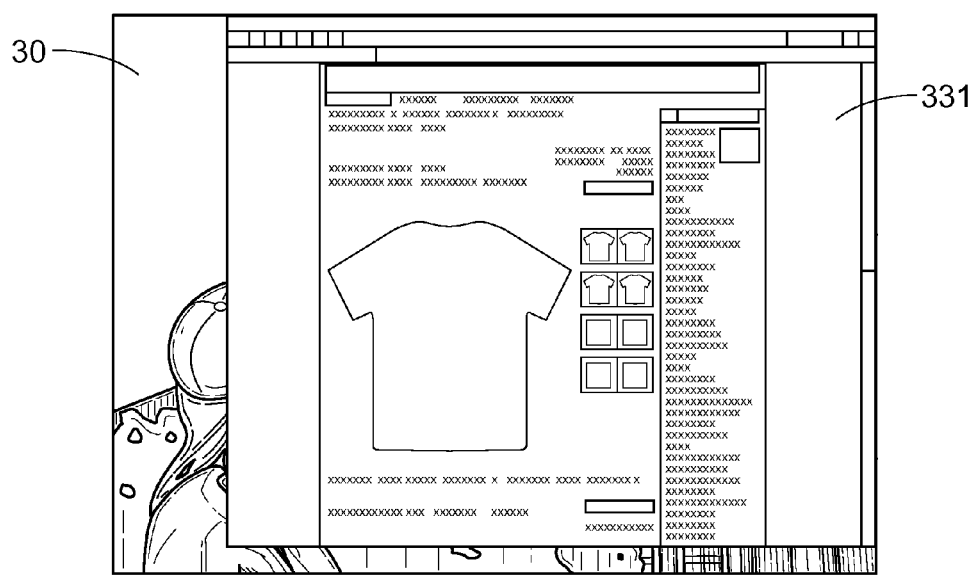

If a user interface for pausing the playback of a title and causing the Web browser 9 to access a specific Web page on the WAN 300 is defined by the script of the content definition data of the content of an area object, it is possible to define a Web access action in which the playback of a title is paused, and the Web page obtained by the Web browser 9 accessing a specific Web page on the WAN 300 is displayed in the Web browser window set in the display screen of the display 12. If such a Web access action is defined for the area object 33 as shown by 330 in FIG. 3B, when the user points to an image portion of a T-shirt in the moving image, which is an interactive logical display object defined by the area object 33, using the pointing device 11, as shown in FIG. 3D an interactive operation for pausing the playback of the title and displaying the Web page of the site selling this T-shirt in the Web browser window 331 is achieved.

In this manner, the playback control section 7 functions as an action execution section executing an action defined for the selected area object when accepting a selection by the pointing device 11.

In the following, a description will be given of the operation for supporting the user's selection of an interactive logical display object in such a video player 100. The playback control section 7 also functions as a selection support section for performing display-object selection support processing for such support.

Figure 4:
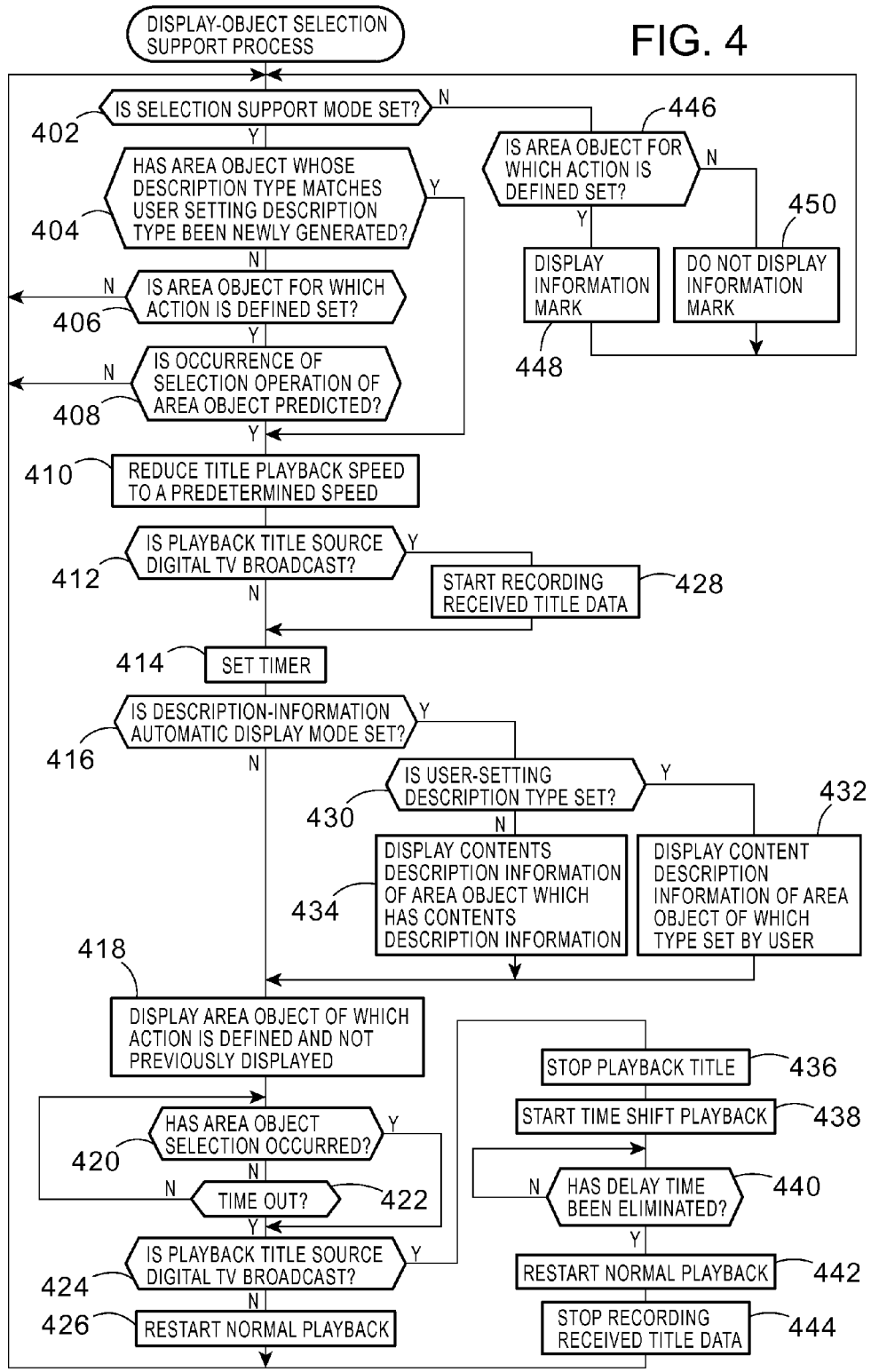
FIG. 4 is a flowchart illustrating display-object selection support processing according to the embodiment of the present invention.
Figure 6A:
FIG. 6 illustrates an example of a display screen of the video player according to the embodiment of the present invention.

FIG. 4 illustrates steps of the display-object selection support processing. As shown in the figure, in this processing, a check is made on whether the user has set a selection support mode (step 402). If not set, a check is made on whether an area object for which an action is defined is set (step 446). If it is set, an information mark 61 indicating that there is an interactive logical display object is displayed on the moving image 60 as shown in FIG. 6A (step 448). If it is not set, the information mark 61 is not displayed (step 450). The processing then returns to the processing from step 402. In this regard, the selection support mode is a mode that can be optionally set by the user.

If the selection support mode is set by the user (step 402), a check is made of whether a new setting has occurred of an area object set by a content whose description type of the content description information of the content-playback control information matches the user setting type set, which is the type set by the user in advance (step 404). If a new setting has occurred, the processing proceeds to step 410. If a new setting has not occurred, a check is made on whether an area object for which an action is defined is set (step 406). If not set, the processing returns to the processing from step 402. In this regard, the user setting type can be optionally set by the user when the selection support mode and description-information automatic display mode described below are set.

On the other hand, if an area object for which an action is defined is set (step 406), a check is made on whether the occurrence of a selection operation of an area object is predicted (step 408). If predicted, the processing proceeds to step 410. If not predicted, the processing returns to the processing from step 402.

Figure 5A:
FIG. 5 illustrates a method of predicting the occurrence of a user's selection operation in a video player according to the embodiment of the present invention.
Figure 5B:
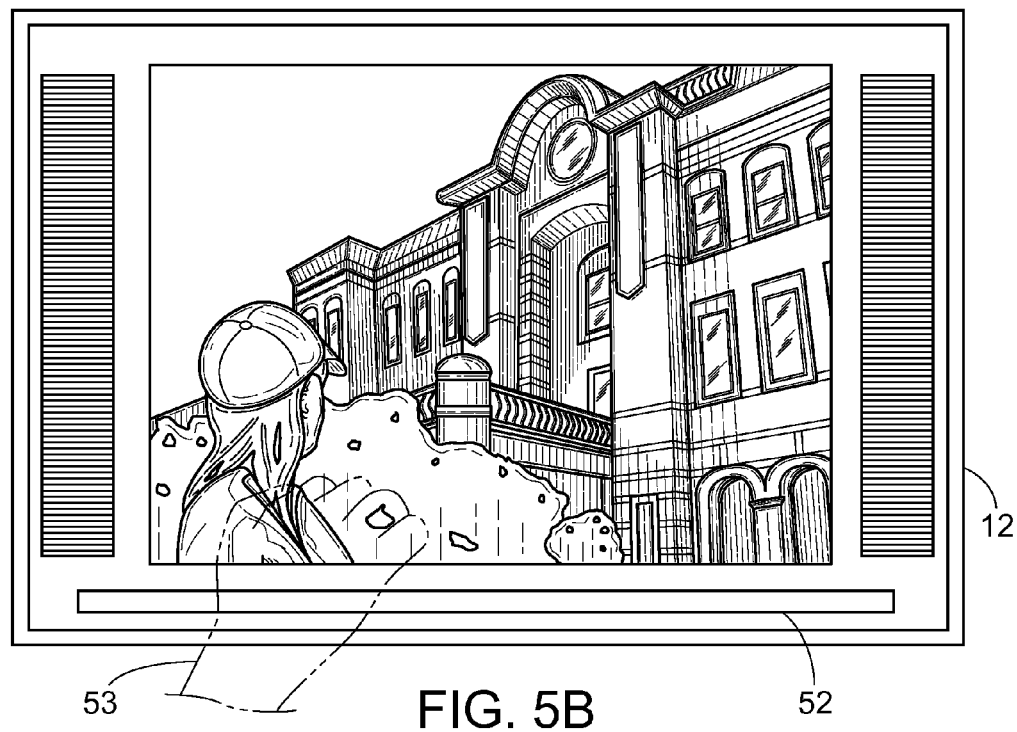

Here, when accepting positional input for selecting an area object by the pointing device 11 using the cursor 51 displayed on the display 12 as shown in FIG. 5A, the prediction of the occurrence of the selection operation of an area object by the user is carried out by the playback control section 7 functioning as a selection operation support section predicting the occurrence of the selection operation of the area object when a move operation of the cursor 51 by the pointing device 11 (a move operation of the mouse when the pointing device 11 is a mouse, or a key-press operation of the direction key or a contact operation of a finger on the key direction surface when the pointing device 11 is an apparatus provided with cursor movement direction keys) has occurred. In this regard, regardless of the position of the cursor 51, when a move operation of the cursor 51 occurs, it is predicted that the selection operation of the area object will occur. Alternatively, when accepting positional input for selecting an area object by a touch panel using a touch panel disposed on the display screen of the display 12 as the pointing device 11, as shown in FIG. 5B, a proximity sensor 52 detecting the proximity of a user's hand 53 in the vicinity of the display screen of the display 12 is provided. The prediction of the occurrence of the selection operation of an area object by the user is carried out when the detection of the proximity of a user's hand 53 to the display screen by the proximity sensor 52 has occurred. For the proximity sensor 52, various sensors, such as a capacitance proximity sensor, an optical proximity sensor, or an ultrasonic-wave proximity sensor, etc., can be used.

Referring back to FIG. 4, when the processing proceeds to step 410, the playback control section 7 changes the playback speed of the title to a predetermined speed that is slower than usual. Here, the predetermined speed may be zero. Thus, by the reduction of playback speed of the title, the title is displayed at a slower speed or paused. In this regard, the change of playback speed of the title to a predetermined slower speed than usual is carried out by, for example, decreasing the system timer speed used for the reference of the playback time in the video player 100 to be lower than the timer speed at normal playback. Alternatively, the timer may be stopped.

When the playback speed of the title is changed to a predetermined speed which is slower than usual (step 410), a check is made on whether the title currently being played back is a title being received by the digital TV receiver 4 (step 412). If not, the processing proceeds to step 414. If the title is a title being received by the digital TV receiver 4, the title data received by the digital TV receiver 4 thereafter is started to be recorded into the storage 2.

When the processing proceeds to step 414, a timer having a predetermined time-out time is set, and a check is performed on whether a description-information automatic display mode is set (step 416). The description-information automatic display mode is a mode which can be set optionally by the user.

If the description-information automatic display mode is set (step 416), a check is further made of whether the user setting type is set (step 430). If not set, the content description information is displayed for a certain time period for each area object whose content description information is set in the content-playback control information (step 434), and an area object whose action is other than the display of content description information is visibly displayed for a certain time period (step 418). The processing then proceeds to step 420. Here, the visible display of the area object is carried out by the playback control section 7 displaying the figure indicating the outline of the area object (content disposition area).

Figure 6B:

As a result, when the three area objects 31, 32, and 33 shown in FIG. 3B are set, as shown in FIG. 6B the display of content description information 621 and 622 of the two area objects 31 and 32 whose content description information is defined and a FIG. 633 indicating the range of the area object 33 whose Web access action is defined are displayed on the moving image object 60.

On the other hand, if the user setting type is set (step 430), the content description information is displayed for a certain time period for each area object whose user setting type is recorded in the content-playback control information (step 432), and an area object whose action is other than the display of the content description information is visibly displayed for a certain time period (step 418).

Figure 6C:
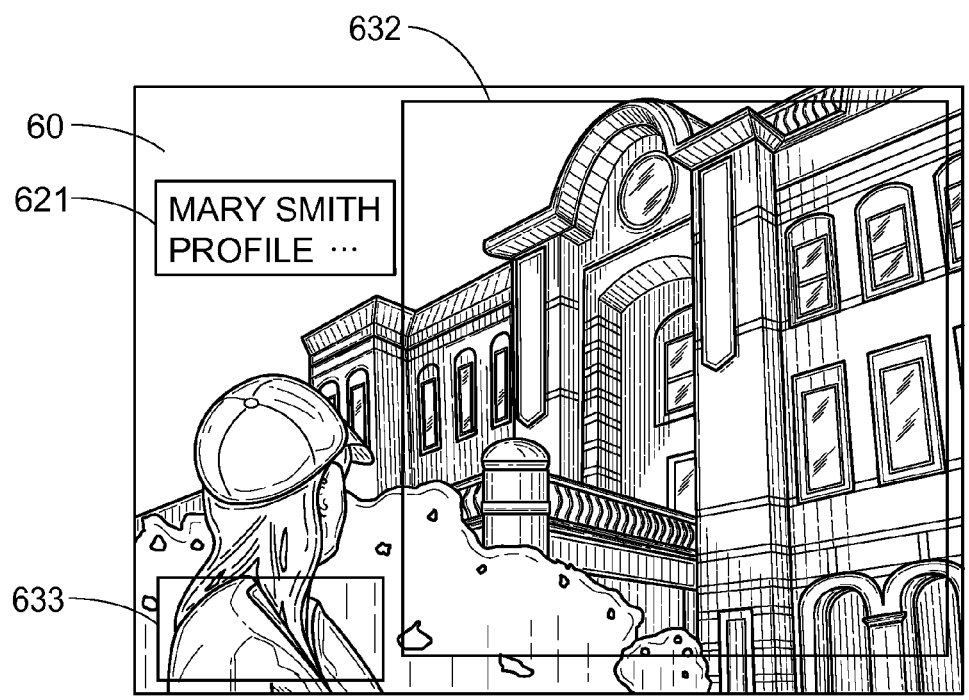

As a result, when the three area objects 31, 32, and 33 shown in FIG. 3B are set, and a user setting type "person" is set by the user, as shown in FIG. 6C the display 621 of the content description information of the area object 31 whose content description information of the description type "person" is defined and the FIGS. 632 and 633 indicating the ranges of the remaining area objects 32 and 33 are displayed on the moving image object 60.

Figure 6D:
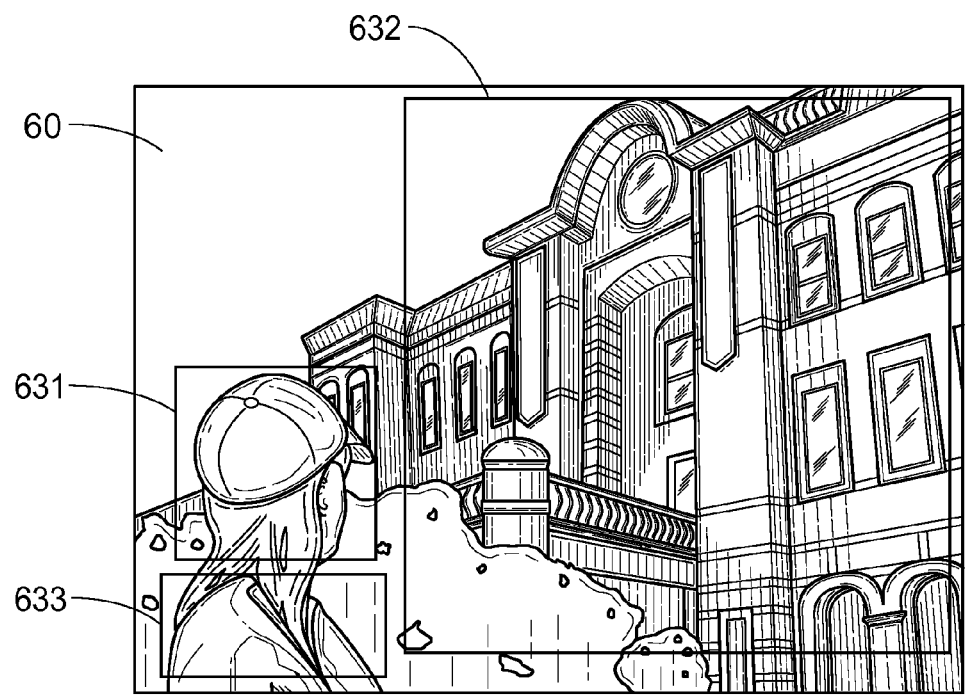

On the other hand, if the description-information automatic display mode is not set in step 416, the areas of all area objects whose actions are defined are visibly displayed for a certain time period (step 418). As a result, when the three area objects 31, 32, and 33 shown in FIG. 3B are set, as shown in FIG. 6D the FIGS. 631, 632 and 633 indicating the ranges of the three area objects 31, 32 and 33 are displayed on the moving image object 60.

In this regard, the step 418 may be processing for visibly displaying all area objects whose actions are defined for a certain time period.

Monitoring is performed on the occurrence of the selection of an area object by the user (step 420) and the occurrence of time out of the timer set in step 414 (step 422). If either of the above has occurred, a check is made on whether the title currently being played back is the title being received by the digital TV receiver 4 (step 424). If not, the playback of the title at normal playback speed is restarted (step 426), and the processing returns to the processing from step 402. In this regard, the playback control section 7 executes the action defined for that area object as described above in accordance with the selection of the area object that occurred in step 420.

On the other hand, if it is determined that the title currently being played back is the title being received by the digital TV receiver 4 in step 424, the playback of the title is stopped (step 436). The time shift playback of the title using the title data recorded in the storage 2 is started from the playback-stop time position at a speed somewhat faster than the normal playback speed (step 438). When the time shift playback for the playback time to the current time is completed, and the delay of the playback time has been eliminated (step 440), the playback of the title being received by the digital TV receiver 4 at the normal speed is restarted (step 442), the recording of the title data into the storage 2 is stopped (step 444), and the processing returns to the processing from step 402.

By the above-described display-object selection support processing, if the user setting type is set, when an interactive logical display object matching the user setting type exists, the title display state changes to pause or slow playback, and as shown in FIG. 6C the content description information 621 whose description type matches the user setting type is automatically displayed. Also, a part or all of the other interactive logical display object areas are visualized by the FIGS. 632 and 633.

If the user setting type is not set and the selection support mode is set, when the user starts a move operation of the cursor 51 for the operation of an interactive logical display object or brings a hand close to the touch panel, the playback state of the title is changed to pause or slow playback. If the description-information automatic display mode is set, as shown in FIG. 6B the content description information 621 and 622 of the interactive logical display objects is automatically displayed, and a part or all of the remaining interactive logical display object area is visualized by the FIG. 633. Also, if the description-information automatic display mode is not set, as shown in FIG. 6D all of the interactive logical display object areas are visualized by the FIGS. 631, 632 and 633.

When the title received by the digital TV receiver 4 is being played back, after the slow display of the title or pause display, time shift playback having a higher speed is performed until the playback time catches up to the current time. Thus, the user will not miss part of the title by the slow display or pause display of the title.

In such a video player 100, the playback control section 7 controls the execution of the above-described Web access action as follows. When the user selects an interactive logical display object for which a Web access action is defined, the playback control section 7 performs the Web access execution control processing as shown in FIG. 7A. In this regard, whether a Web access action is defined for the interactive logical display object can be identified by the script recorded in the content definition data of the content of the area object defining that interactive logical display object.

First, a check is made on whether it access to the WAN 300 using the network interface 5 is allowed (step 702). If it is allowed, the Web access action is executed (step 704). If access to the WAN 300 is not allowed (step 702), a check is made on whether the title being played back now is a title from the DVD disc 200 (step 706). If the title is not a title from the DVD disc 200, the script describing the contents of the Web access action is saved in the storage 2 as a waiting script (step 708), waiting-script execution processing using the saved waiting script as a target waiting script is started (step 710), and the processing is terminated.

On the other hand, if the title being played back now is a title from the DVD disc 200, the user is asked whether to save the current playback state (step 712). If instructed to save (step 714), a playback state such as the playback time position of the current title is saved in the memory card 400 (step 716), and the processing is terminated. If instructed not to save (step 714), the script describing the contents of the Web access action is saved in the storage 2 as a waiting script (step 708), waiting-script execution processing using the saved waiting script as a target waiting script is started (step 710), and the processing is terminated.

Figure 7B:
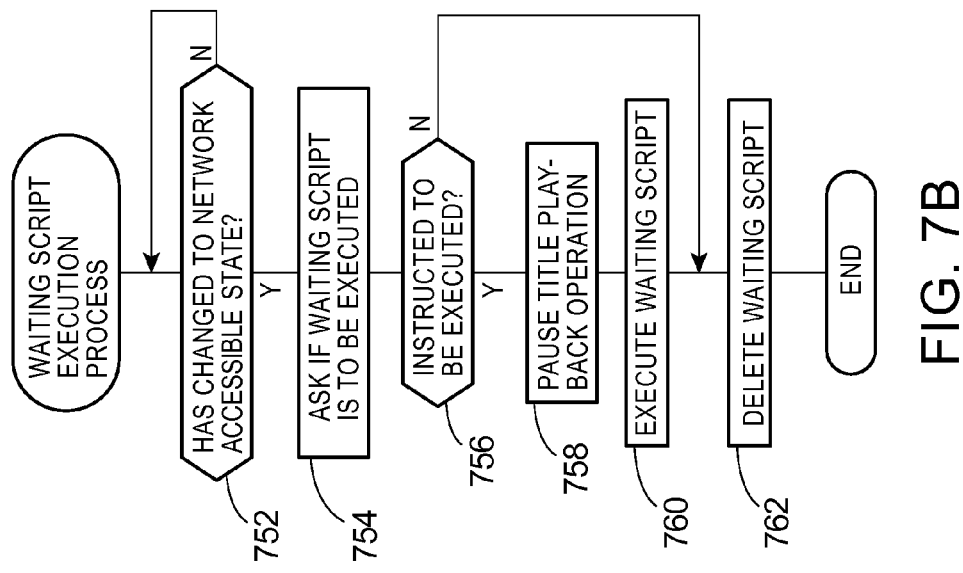
FIG. 7 is a flowchart illustrating Web-access action execution control processing and waiting script execution processing according to the embodiment of the present invention.
Figure 7A:
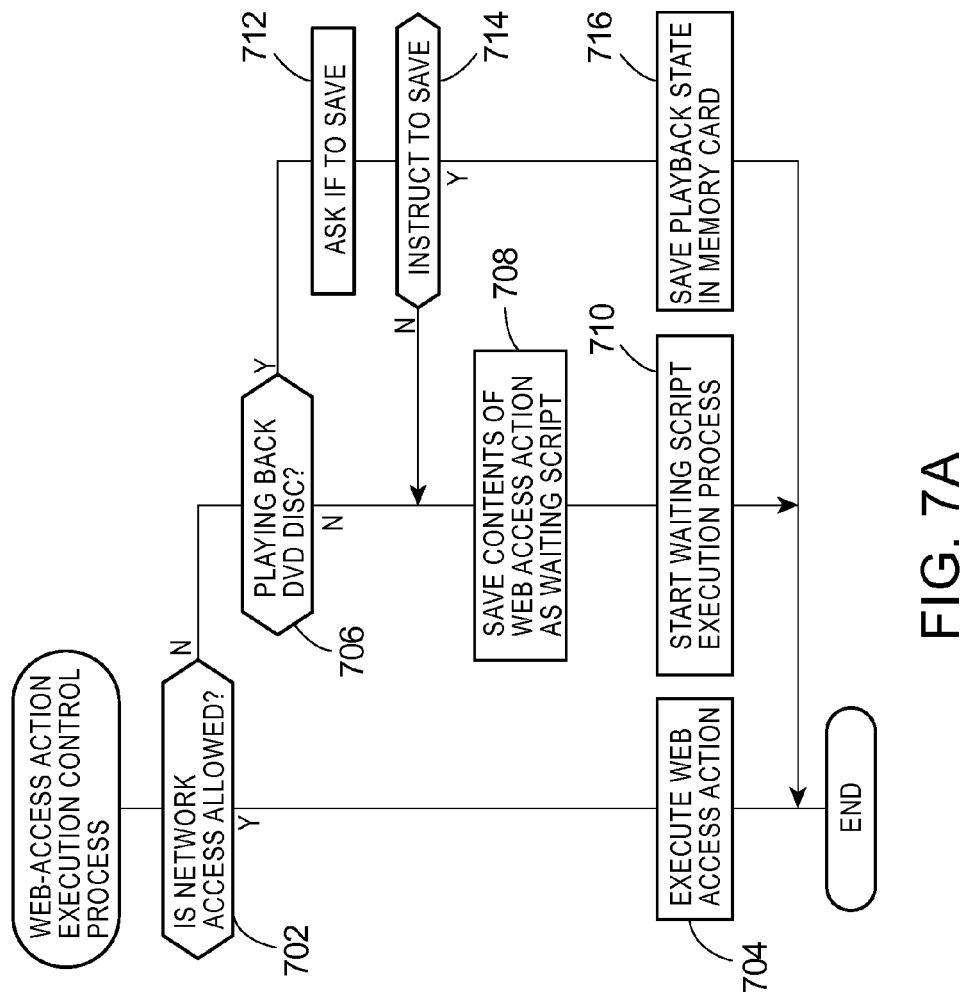

In the waiting-script execution processing started in step 710 of the Web-action execution control processing, the processing shown in FIG. 7B is executed. In the waiting-script execution processing, monitoring is performed on whether access to the WAN 300 using the network interface 5 is allowed (step 752). If the WAN 300 becomes accessible, the user is asked whether to execute the target waiting script (step 754). If instructed to execute (step 756), the playback of the title being played back at that time is paused (step 758), the target waiting script saved in the storage 2 is executed (step 760), the target waiting script is deleted from the storage 2 (step 762), and the processing is terminated.

On the other hand, if instructed not to execute the target waiting script (step 756), the target waiting script is directly deleted from the storage 2 (step 762), and the processing is terminated.

The playback control section 7 performs processing to return the playback state of the title of a DVD disc 200 loaded in the DVD drive 3 to a playback state stored in the memory card 400 in response to a request from the user. However, if a DVD disc 200 to be the target of the playback state stored in the memory card 400 is not loaded in the DVD drive 3, a message for prompting the loading of a DVD disc 200 to be the target of the playback state stored in the memory card 400 is displayed, and the processing is directly terminated.

By the above processing, when a Web access action cannot be executed because access to the WAN 300 is not allowed at the Web access action execution time, it is possible to execute that Web access action at a later point in time when access to the WAN 300 becomes possible. Also, when a Web access action occurring during the playback of a title from the DVD disc 200 cannot be executed because the video player 100 is not allowed to access the WAN 300, a memory card 400 storing the playback state at the time of the Web access action execution and the title may be moved to another video player 100 capable of accessing the WAN 300, and the playback state of the title of the DVD disc 200 is returned to the playback state of the Web access action, and thus it is possible for the other video player 100 to execute the Web access action.

In the above-described embodiment, a description has been given of the video player 100 provided with both the DVD drive 3 (disc apparatus) and the digital TV receiver 4 (digital broadcast receiver), and capable of selectively playing back either a title defined by the title data read from the DVD disc 200 or the title data received by the digital TV receiver 4. However, it goes without saying that the present invention can be achieved by a video player provided only with either a disc apparatus or a digital broadcast receiver.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. A video player for playing back and displaying a moving image, the video player including a processor and comprising:
   a moving-image playback and display section executed by the video player and configured for playing back to display the moving image on the basis of video data representing the moving image including a display object for which an action is defined;
   a selection acceptance section executed by the video player and configured for accepting from a user a selection of the display object included in the moving image being played back and displayed by the moving-image playback and display section using a cursor displayed on the moving image and capable of being moved;
   an action execution section executed by the video player and configured for executing the action defined for the display object the selection of which is accepted by the selection acceptance section;
   a selection support section executed by the video player and including a selection-operation occurrence prediction section configured for detecting an occurrence of a selection preparatory operation as a move operation of the cursor by the user, wherein when the selection-operation occurrence prediction section detects the occurrence of the selection preparatory operation, a playback-speed control section changes a playback speed of the moving image to a playback speed of displaying the moving image by slow display or pause display, and content description information of a display object in the moving image whose description type matches a type set by the user in advance is displayed;
   a display-object detection section executed by the video player and configured for detecting an appearance of the display object in the moving image whose description type matches a type set by the user in advance, wherein in response to the display-object detection section detecting the appearance, the playback-speed control section changes a playback speed of the moving image to a playback speed of displaying the moving image by slow display or pause display; and
   a receiver configured for receiving the video data as a broadcast, wherein the moving-image playback and display section plays back and displays the moving image on the basis of the video data being received by the receiver in real time with the reception of the video data, and when the playback-speed control section of the selection support section changes a playback speed of the moving image to a playback speed of displaying the moving image by slow display or pause display, the playback-speed control section starts recording for time-shift playback of the video data being received by the receiver, terminates playback of the moving image at a playback speed of displaying the moving image by slow display or pause display at a predetermined time, and starts time-shift playback of the moving image using video data recorded at the playback position at which playback was terminated;
   wherein the playback-speed control section of the selection support section automatically causes the moving-image playback and display section to perform the time-shift playback at a playback speed such that the moving image is displayed at a faster than normal speed until reaching a playback position at the current time, at which the moving image is played back in real time with the reception of the video data.

2. The video player according to claim 1,
   wherein the selection support section includes display-object position presentation means configured for displaying a position on the moving image of the display object for which the action is defined on the moving image when the selection-operation occurrence prediction section has detected the occurrence of the selection preparatory operation.

3. The video player according to claim 1,
   wherein an action defined for the display object includes an attribute display action, being an action for displaying an item on the display object, and
   the selection support section includes an attribute display section configured for displaying the item when the selection-operation occurrence prediction section has detected the occurrence of the selection preparatory operation.

4. The video player according to claim 1, further comprising:
   a network connection section configured for connecting to a network,
   wherein the action defined for the display object includes a network access action for accessing information on the network, and
   when the action execution section fails to connect to the network using the network connection section at the time of executing a network access action, the action execution section saves information for identifying contents of the network access action.

5. A video player for playing back and displaying a moving image, the video player including a processor and comprising:
   a moving-image playback and display section executed by the video player and configured for playing back to display the moving image on the basis of video data representing the moving image including a display object for which an action is defined;
   a selection operation acceptance section executed by the video player and configured for accepting from a user a selection operation of the display object included in the moving image being played back and displayed by the moving-image playback and display section;
   an action execution section executed by the video player and configured for executing the action defined for the display object the selection operation of which is accepted by the selection operation acceptance section; and a selection support section executed by the video player, wherein the selection support section includes a selection-operation occurrence prediction section configured for detecting an occurrence of a selection preparatory operation by proximity of the user to the selection operation acceptance section, and when the selection-operation occurrence prediction section detects the occurrence of the selection preparatory operation, a playback-speed control section changes a playback speed of the moving image to a playback speed of displaying the moving image by slow display or pause display; and a display-object detection section executed by the video player and configured for detecting an appearance of the display object in the moving image whose description type matches a type set by the user in advance, wherein in response to the display-object detection section detecting the appearance of the display object in the moving image whose description type matches a type set by the user in advance, the playback-speed control section changes a playback speed of the moving image to a playback speed of displaying the moving image by slow display or pause display and an attribute display section displays content description information for the display object.

6. The video player according to claim 5,
wherein the selection operation acceptance section is a touch panel, the video player is provided with a proximity sensor detecting the proximity of a hand to the touch panel, and when the proximity sensor has detected the proximity of a hand to the touch panel, the selection-operation occurrence prediction section detects the occurrence of the selection preparatory operation.

7. The video player according to claim 5,
wherein the selection support section includes display-object position presentation means configured for displaying a position on the moving image of the display object for which action is defined on the moving image when the selection-operation occurrence prediction section has detected the occurrence of the selection preparatory operation.

8. The video player according to claim 5,
wherein the action defined for the display object includes an attribute display action, being an action for displaying an item on the display object, and
the selection support section includes an attribute display section configured for displaying the item when the selection-operation occurrence prediction section has detected the occurrence of the selection preparatory operation.

9. The video player according to claim 5, further comprising:
a receiver configured for receiving the video data as a broadcast, wherein the moving-image playback and display section plays back and displays the moving image on the basis of the video data being received by the receiver in real time with the reception of the video data, and
when the playback-speed control section of the selection support section changes a playback speed of the moving image to a playback speed of displaying the moving image by slow display or pause display, the playback-speed control section starts recording for time-shift playback of the video data being received by the receiver, terminates playback of the moving image at a playback speed of displaying the moving image by slow display or pause display at a predetermined time, and starts time-shift playback of the moving image using video data recorded at the playback position at which playback was terminated.

10. The video player according to claim 9,
wherein the playback-speed control section of the selection support section causes the moving-image playback and display section to perform the time-shift playback at a playback speed such that the moving image is displayed at a faster than normal speed until a playback position at which the moving image is played back in real time with the reception of the video data.

11. The video player according to claim 5, further comprising:
a network connection section configured for connecting to a network,
wherein the action defined for the display object includes a network access action for accessing information on the network, and
when the action execution section fails to connect to the network using the network connection section at the time of executing a network access action, the action execution section saves information for identifying contents of the network access action.

12. A video player for playing back and displaying a moving image, the video player including a processor and comprising:
a moving-image playback and display section executed by the video player and configured for playing back to display the moving image on the basis of video data representing the moving image including a display object for which an action is defined;
a selection operation acceptance section executed by the video player and configured for accepting from a user a selection operation of the display object included in the moving image being played back and displayed by the moving-image playback and display section;
an action execution section executed by the video player and configured for executing the action defined for the display object the selection operation of which is accepted by the selection operation acceptance section; and
a selection support section executed by the video player, wherein the action defined for the display object includes an attribute display action, being an action displaying an item on the display object, and the selection support section includes
a display-object detection section executed by the video player and configured for detecting an appearance of the display object in the moving image whose description type matches a type set by the user in advance, wherein in response to the display-object detection section detecting the appearance, a playback-speed control section changes a playback speed of the moving image to a playback speed of displaying the moving image by slow display or pause display, and an attribute display section displays content description information for the display object.

13. The video player according to claim 12, further comprising:
a receiver configured for receiving the video data as a broadcast,
wherein the moving-image playback and display section plays back and displays the moving image on the basis of the video data being received by the receiver in real time with the reception of the video data, and when the playback-speed control section of the selection support section changes a playback speed of the moving image to a playback speed of displaying the moving image by slow display or pause display, the playback-speed control section starts recording for time-shift playback of the video data being received by the receiver, terminates playback of the moving image at a playback speed of displaying the moving image by slow display or pause display at a predetermined time, and starts time-shift playback of the moving image using video data recorded at the playback position at which playback was terminated.

14. The video player according to claim 13,
wherein the playback-speed control section of the selection support section causes the moving-image playback and display section to perform the time-shift playback at a playback speed such that the moving image is displayed at a faster than normal speed until a playback position at which the moving image is played back in real time with the reception of the video data.

15. The video player according to claim 12, further comprising:
a network connection section configured for connecting to a network,
wherein the action defined for the display object includes a network access action for accessing information on the network, and
when the action execution section fails to connect to the network using the network connection section at the time of executing a network access action, the action execution section saves information for identifying contents of the network access action.

16. On the basis of video data representing a moving image including a display object for which an action is defined, in a video player playing back the moving image and provided with an operation section for accepting a user's operation, a method of controlling playback of the moving image, the method comprising the steps of:
accepting from the user a selection of the display object included in the moving image being played back and displayed using the operation section;
executing the action defined for the display object the selection of which is accepted;
detecting an occurrence of a selection preparatory operation by proximity of the user to the operation section,
changing a playback speed of the moving image to a playback speed of displaying the moving image by slow display or pause display when the occurrence of the selection preparatory operation is detected;
displaying content description information of a display object whose description type matches a type set by the user in advance;
detecting an appearance of the display object in the moving image whose description type matches a type set by the user in advance;
changing the playback speed of the moving image to a playback speed of displaying the moving image by slow display or pause display when the appearance of the display object whose description type matches a type set by the user in advance is detected; and
receiving the video data as a broadcast, wherein the moving image is displayed on the basis of the video data being received by the receiver in real time with the reception of the video data, and when the playback speed of the moving image is changed to a playback speed of displaying the moving image by slow display or pause display, recording is started for time-shift playback of the video data being received, playback of the moving image at a playback speed of displaying the moving image by slow display or pause display is terminated at a predetermined time, and time-shift playback of the moving image is started using video data recorded at the playback position at which playback was terminated;
wherein the time-shift playback is automatically performed at a playback speed such that the moving image is displayed at a faster than normal speed until reaching a playback position at the current time, at which the moving image is played back in real time with the reception of the video data.

17. A method of controlling playback by a video player of video data representing a moving image including a display object for which an action is defined, wherein the action defined for the display object includes displaying an item on the display object, the method comprising the steps of:
accepting from the user a selection of the display object included in the moving image being played back and displayed by the video player;
executing by the video player the action defined for the display object the selection of which is accepted;
detecting by the video player an appearance of a display object in the moving image whose description type matches a type set by the user in advance;
changing by the video player the playback speed of the moving image to a playback speed of displaying the moving image by slow display or pause display in response to detecting the appearance of the display object whose description type matches a type set by the user in advance; and
displaying by the video player content description information for the display object in response to detecting the appearance of the display object whose description type matches a type set by the user in advance.

* * * * *